(12) United States Patent
Shimizu et al.

(10) Patent No.: US 7,684,468 B2
(45) Date of Patent: Mar. 23, 2010

(54) WIRELESS COMMUNICATION DEVICE (75) Inventors: Yuichiro Shimizu, Saitama (JP);
Yukitoshi Sanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 11/381,325

(22) Filed: May 2, 2006

(65) Prior Publication Data
US 2006/0256844 A1 Nov. 16, 2006

(30) Foreign Application Priority Data
May 13, 2005 (JP) ............... 2005-141956

(51) Int. Cl.
*H04L 27/30* (2006.01)
(52) U.S. Cl. ............. 375/147; 375/143; 375/354; 370/503
(58) Field of Classification Search ........... 375/140, 375/143, 147, 152, 256, 340, 343, 354; 370/503, 370/515
See application file for complete search history.

(56) References Cited
U.S. PATENT DOCUMENTS

| | | | |
|---|---|---|---|
| 6,111,536 A | 8/2000 | Richards et al. | |
| 6,289,041 B1 * | 9/2001 | Krasner | 375/152 |
| 6,297,764 B1 * | 10/2001 | Wormington et al. | 342/101 |
| 6,385,259 B1 * | 5/2002 | Sung et al. | 375/343 |
| 6,618,449 B1 * | 9/2003 | Laviec et al. | 375/335 |

FOREIGN PATENT DOCUMENTS

| | | |
|---|---|---|
| JP | 2002517001 | 6/2002 |
| JP | 2005051466 | 2/2005 |

OTHER PUBLICATIONS

Fullerton (US 2003/0189975); Oct. 9, 2003; Method ANd Transceiver For Full Duplex Communication Of Ultra Wideband Signals.*
Lee et al., "Toward Digital UWB Radios: Part II—A System Design to Increase Data Throughput for a Frequency Domain UWB Receiver".
IEEE 802.15 WPAN Low Rate Alternative PHY Task Group 4a (TG4a).

(Continued)

*Primary Examiner*—Dac V Ha
(74) *Attorney, Agent, or Firm*—K&L Gates LLP (57) ABSTRACT

A wireless communication device is provided. The wireless communication device executes digital processing for a received UWB signal with use of an A/D converter having an adequate sample rate and resolution, and thus can obtain precise reception timing information. Since the sample rate of an A/D converted output is high, a timing detection circuit is formed of two-stage matched filters. The former-stage chip matched filter calculates the correlation between an input signal and a template signal. When a correct transmission pulse signal has arrived, the chip matched filter outputs to a frame matched filter an indication as to the presence of a pulse and reception timing. The latter-stage frame matched filter calculates the correlation value between a received frame signal and a spreading code to thereby determine whether the received frame is correct or incorrect, and adequately changes a threshold value of the chip matched filter.

5 Claims, 8 Drawing Sheets

OTHER PUBLICATIONS

Shimizu et al., "Accuracy of Relative Distance Measurement with Ultra Wideband System," vol. J86-A, pp. 1310-1319, Dec. 2003.

Lee et al., "Toward Digital UWB Radios: Part I—Frequency Domain UWB Receiver with 1 bit ADC's".

Guadenzi et al., "A Digital Chip Timing Recovery Loop for Band-Limited Direct-Sequence Spread-Spectrum Signals," IEEE Transactions on Communications, vol. 41, pp. 1760-1769, Nov. 1993.

Shimizu et al. "Relative Distance Measurement with Ultra Wideband System with High Speed 1.5 bit A/D Converter".

* cited by examiner

WIRELESS COMMUNICATION DEVICE

CROSS REFERENCES TO RELATED APPLICATIONS

The present application claims priority to Japanese Patent Application JP 2005-141956 filed in the Japanese Patent Office on May 13, 2005, the entire contents of which being incorporated herein by reference.

BACKGROUND

The present application relates to a wireless communication device that receives and processes an Ultra Wide Band (UWB) signal in which information is loaded on an extremely weak impulse train by use of an ultra-wide frequency band, and particularly to a wireless communication device that measures the distance between objects by utilizing UWB communication with a transmitter based on a weak impulse train.

More specifically, the present application relates to a wireless communication device that determines the position of a transmitter by utilizing information on the timing of reception of a UWB signal from the transmitter, and particularly to a wireless communication device that executes digital processing for a received UWB signal to thereby detect the reception timing.

Recent trends of wireless LAN systems toward higher speed and lower costs are significantly increasing the demands therefor. In particular, the introduction of Personal Area Networks (PAN) is currently being studied in order to establish a small-scale wireless network among plural electronic apparatuses existing around a person and thus implement information communication in the network. For example, by utilizing frequency bands that need no license from regulatory authorities, such as the 2.4 GHz band and 5 GHz band, different wireless communication systems and wireless communication devices are provided.

Furthermore, in recent years, a wireless communication system called Ultra Wide Band (UWB) communication in which information is loaded on an extremely weak impulse train to implement wireless communication is attracting attention as a wireless communication system that can realize ultra-high speed transmission in short distances. The practical use thereof is expected.

In the United States, the Federal Communication Commission (FCC) has eased regulations regarding the UWB systems in February, 2002 (refer to e.g. Shigenobu Sasaki, Tetsushi Ikegami, and Yukitoshi Sanada, "UWB shisutemu to gijutsu ni kansuru kokusaikaigi (UWBST2002) houkoku (Reports on international conference (UWBST2002) regarding UWB systems and techniques)" (SST2002-19, July, 2002)). The easing of regulations is to allow emission of radio waves with output power up to −41.3 dBm/MHz in the frequency range from 3.1 GHz to 10.6 GHz. Currently, in IEEE 802.15.3 and so forth, it has been proposed to use a transmission method for data with a packet structure including a preamble, as an access control method in Ultra Wide Band communication (refer to e.g. http://grouper.ieee.org/groups/802/15/pub/SG4a.html).

The UWB system has a high time resolution because of the employment of ultra short pulses, and thus can implement ranging, i.e., radar operation and positioning, with use of this characteristic. In particular, recent UWB communication can achieve a function of high-speed data transmission over 100 Mbps in addition to the original ranging function (refer to e.g. JP-A-2002-517001).

It is expected that, in the future, Wireless Personal Access Networks (WPAN) of short-distance communication typified by UWB are included in various appliances and Consumer Electronics (CE) apparatuses. Therefore, besides high-speed data transmission, another added value of wireless communication is expected. Specifically, utilization of position information due to ranging, such as navigation and Near Field Communication (NFC), is expected. Accordingly, it will be desirable to provide a wireless communication device with a ranging function in addition to a high-speed data transmission function.

Figure 14:
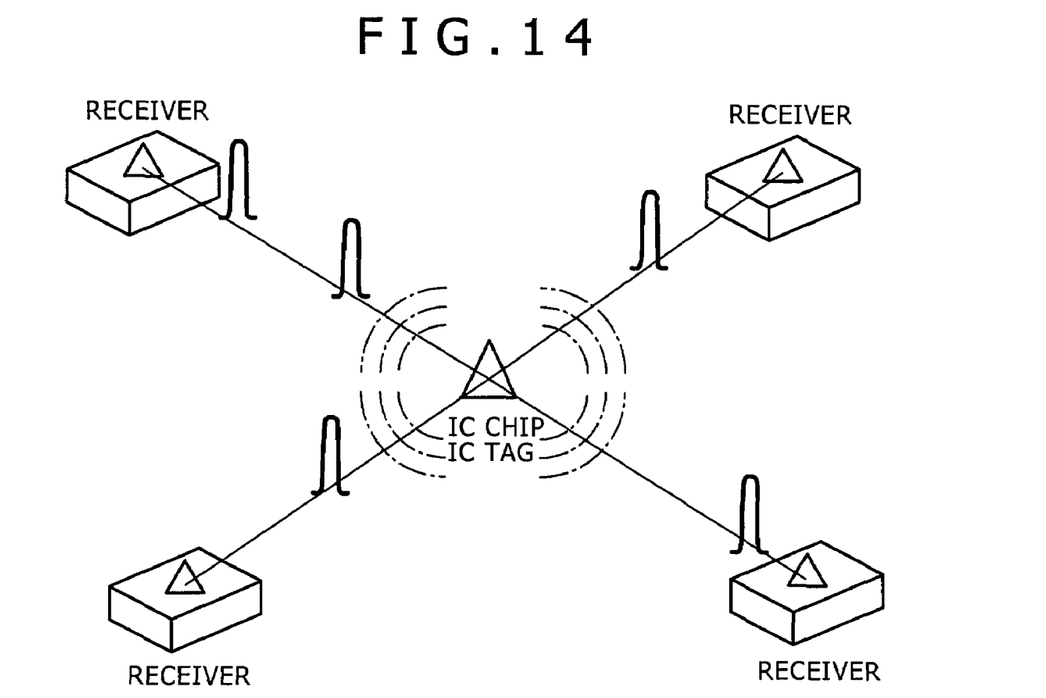
FIG. 14 is a diagram schematically illustrating the configuration of a ranging system that employs UWB communication.

FIG. 14 schematically illustrates the configuration of a ranging system that employs UWB communication. The illustrated system is based on the premise that UWB communication is utilized not for data transmission but mainly for ranging. A transmitter is formed of a small device such as an IC chip or IC tag, and transmits a UWB signal including a known pattern. Receivers existing around the transmitter detect information on the reception timing of a received UWB signal to thereby detect the distance to the transmitter and the position of the transmitter.

In order for the receiver to detect the distance and position, it is needed for the receiver to acquire precise information on the reception timing of a UWB signal.

Figure 15:
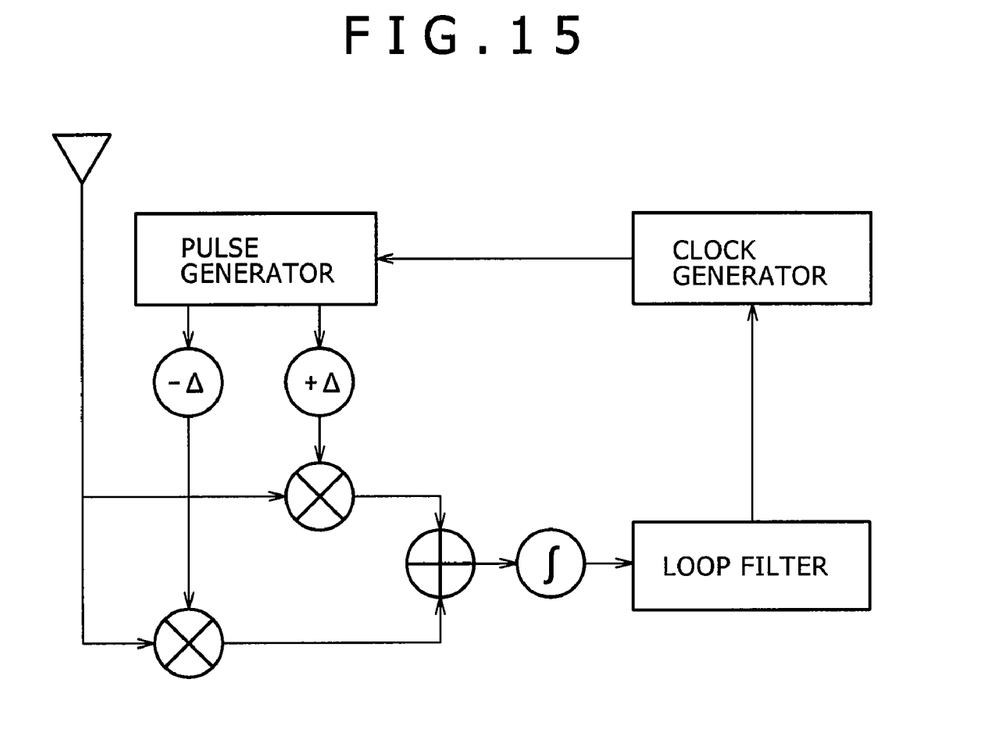
FIG. 15 is a diagram illustrating a configuration example of a system that executes analog processing for a UWB signal to thereby detect reception timing information.

For example, a technique has been proposed in which a UWB signal is subjected to analog processing to thereby detect reception timing information (refer to e.g. Y. Shimizu and Y. Sanada, "Accuracy of Relative Distance Measurement with Ultra Wideband System" IEICE Transactions on Fundamentals of Electronics, Communications and Computer Sciences, vol. J86-A, no. 12, pp. 1310-1319, December 2003 (in Japan)). The circuit configuration of this technique is based on an analog circuit, shown in FIG. 15, that includes an antenna part, a template generation circuit, a loop filter and a clock generation circuit. The correlation values between a signal received by the antenna part and a signal generated by the template generation circuit are calculated. The loop filter detects the reception timing based on the correlation values, and corrects the reception timing for the clock generator.

However, in order to process a UWB signal, which is a high frequency signal, with analog components, a large number of high-accuracy analog components are required, which causes an increase in costs of the receiver. In addition, an increase in implementation errors is expected, and therefore there is difficulty in design of a high frequency circuit.

When the reception timing of a wideband signal such as a UWB signal is detected with use of an analog circuit, complexity of the circuit cannot be avoided due to the configurations of a delay circuit and a frequency synthesis circuit. Accordingly, use of a method in which digital processing is executed for a received UWB signal to thereby detect the reception timing is conceived. In the digital processing, however, the setting of the sample rate and resolution (the number of bits) of an analog-to-digital (A/D) converter is an issue.

For example, a proposal has been made on a UWB receiver that under-samples a high frequency UWB signal (refer to e.g. Hyung-Jin Lee, Dong Sam Ha, and Hyng-Soo Lee, "Toward Digital UWB Radios: Part I-Frequency Domain UWB Receiver with 1 bit ADCs" (Joint UWBST & IWU-WBS 2004, in Kyoto)). In this UWB receiver, an A/D converter with a resolution of one bit is used, and a large number of analog filter banks are used to obtain correlations on the frequency axis. Therefore, the configuration of the analog circuit is complicated. In addition, the UWB receiver itself does not have a ranging function.

Figure 16:
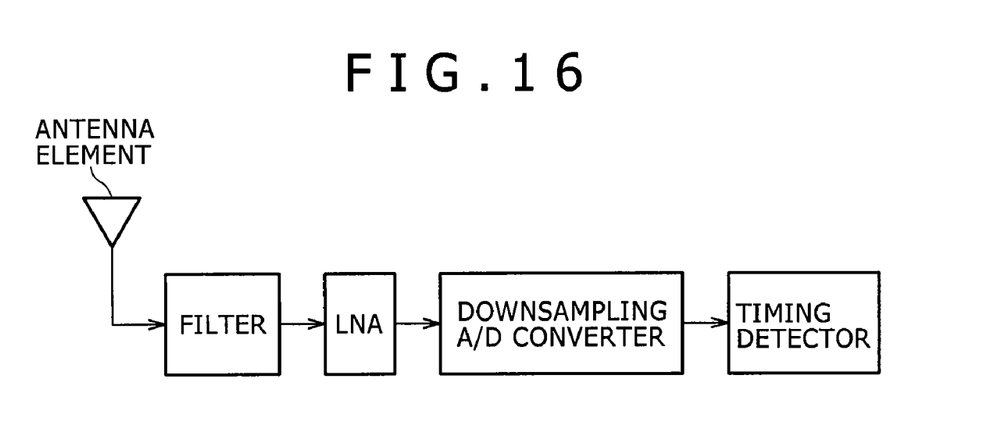
FIG. 16 is a diagram illustrating a configuration example of a system that executes digital processing for a received signal after the frequency of the received signal is down-converted, to thereby detect reception timing information.

As yet another technique, a system has been proposed in which digital processing is implemented after the frequency of a received signal is down-converted, to thereby detect reception timing information (refer to e.g. R. D. Gaudenzi, M. Luise, and R. Viola, "A digital chip timing recovery loop for band limited direct-sequence spread-spectrum signals" (IEEE Trans Commun., vol COM-41, pp. 1760-1769, November 1993)). As shown in FIG. 16, the system includes an antenna part, an A/D converter and a timing detection circuit for digital processing for a CDMA signal in a narrow band. A signal received by the antenna part is converted into a baseband signal, followed by being converted into a digital signal by the A/D converter at the chip rate. The timing detection circuit then detects the reception timing.

Figure 17:
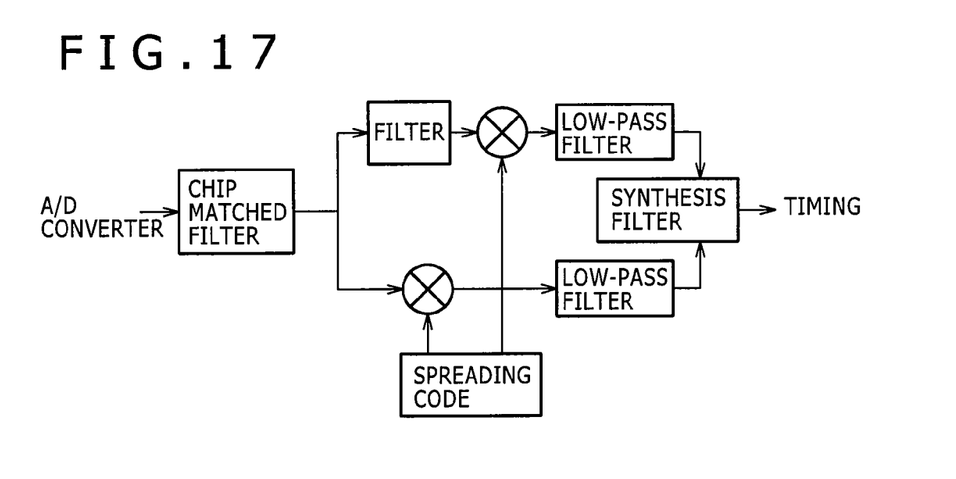
FIG. 17 is a diagram illustrating a configuration example of a timing detection circuit in the system shown in FIG. 16.

Such a system in related art that detects reception timing with a digital circuit is premised on low-speed A/D conversion and digital processing at the chip rate. Therefore, the timing detection circuit has a configuration like one shown in FIG. 17. However, since a UWB signal has a symbol length shorter than that of a narrow band CDMA signal, high-speed A/D conversion and high-speed digital processing are needed. Therefore, execution of complicated digital processing is difficult, and is expected to increase the power consumption and circuit area.

It is not easy to realize, with the circuit configuration of FIG. 16, a system that executes digital processing after down-conversion of the frequency of a received signal. A UWB signal does not employ a carrier, and therefore is difficult to convert into a baseband signal. Consequently, processing is implemented for a signal of which frequency is still high, which requires a high-speed A/D converter and high-speed digital processing. Execution of complicated digital processing is difficult, and is expected to increase the power consumption and circuit area. If a down-conversion circuit based on an analog circuit is added, costs of the receiver increase.

Figure 18:
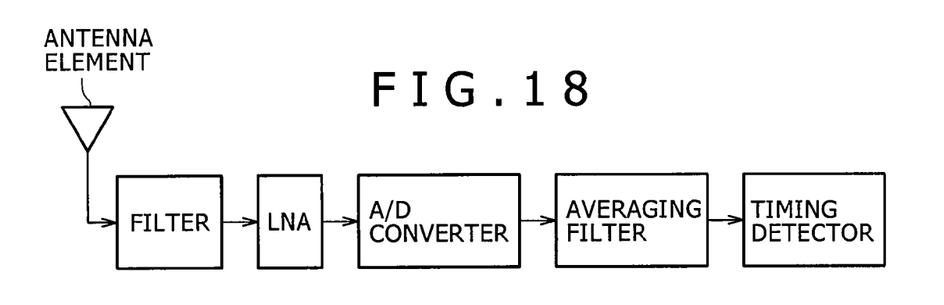
FIG. 18 is a diagram illustrating another example in related art regarding a system that executes digital processing for a received signal to detect the reception timing.

FIG. 18 shows another example regarding a system in related art that executes digital processing for a received signal to detect the reception timing. This system includes an antenna part, an A/D converter, an averaging filter, and a timing detection circuit. A signal received by the antenna part is converted into a digital signal by the A/D converter, followed by being subjected to pre-processing in the averaging filter. The timing detection circuit then detects the reception timing. The resolution and speed of the A/D converter is determined based on the noise level and band of the received signal to be processed by the A/D converter. In general, a method is known in which a high-resolution and high-speed A/D converter is used to detect timing (refer to e.g. Y. Shimizu and Y. Sanada, "Relative Distance Measurement with Ultra Wideband System with High Speed 1.5 bit A/D Converter" (Proc. of the Seventh International Symposium on Wireless Personal Multimedia Communications, vol. 1, pp. 50-54, Abano Terme, Italy, September, 2004)).

Figure 19:
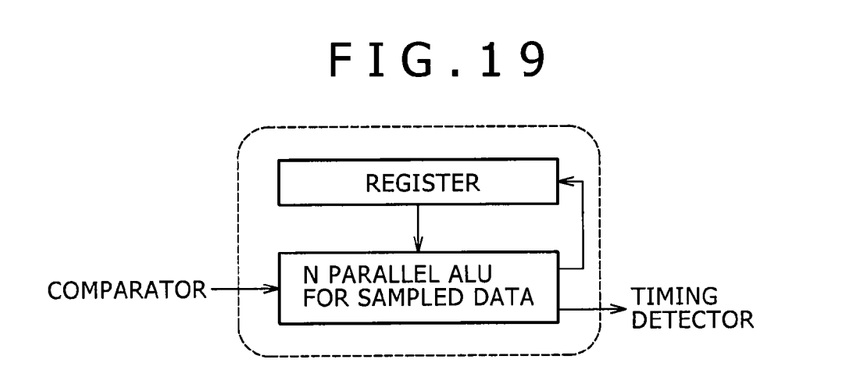
FIG. 19 is a diagram illustrating a configuration example of an averaging filter.

The system shown in FIG. 18 includes an A/D converter with a resolution equal to or larger than 1.5 bits. In this case, input to the averaging filter are samples having positive and negative values. FIG. 19 illustrates a configuration example of an used averaging filter in related art. In order to implement averaging for sample values that are output from an A/D converter and have positive and negative values, Arithmetic Logical Units (ALU) that can add positive and negative values and a register for temporarily storing operation results are required. In addition, there is a need to drive N ALUs in parallel (N denotes the number of samples in one frame time period) in order to implement averaging for the samples in parallel on each received frame unit basis. Therefore, if the sample rate is high, circuit design is difficult and power consumption is large.

Specifically, it is not easy to construct a system that executes digital processing for a received UWB signal and then detects the reception timing, with use of a high-resolution and high-speed A/D converter like one shown in FIG. 18 (adoption of a high-resolution A/D converter in an actual portable apparatus is impractical even if it can be used in an experimental test machine). When a high-resolution and high-speed A/D converter is used, a high-speed averaging filter becomes necessary, which causes an increase in costs of the receiver. In addition, the costs and power consumption of the A/D converter itself also problematically increase.

Another proposal has been made on a UWB device that can suppress power consumption and can shorten a signal capturing time period not only in communication but also in positioning and ranging (refer to e.g. Japanese Patent Laid-open No. 2005-51466). This UWB device enlarges the width of a pulse included in a UWB signal by letting the UWB signal pass through a low-pass filter, to thereby enable conversion of the UWB signal into a digital signal by use of an A/D converter of a low sample rate. However, if the waveform of a received signal is disturbed due to a multipath below the sample rate of the A/D conversion, the UWB device is problematically affected by the waveform disturbance. In addition, in A/D conversion of a long pulse, a received signal is input to plural correlators and peak search is carried out based on the outputs from the respective correlators to thereby change the sampling timing. However, the execution of the peak search involves problems that the UWB device is susceptible to noises and the positioning distance is transparently decreased.

It is desirable to provide an excellent wireless communication device that can adequately measure the distance between objects by utilizing UWB communication with a transmitter based on a weak impulse train in particular.

It is further desirable to provide an excellent wireless communication device that executes digital processing for a received UWB signal and thus can detect the reception timing.

It is still further desirable to provide an excellent wireless communication device that executes digital processing for a received UWB signal with use of an A/D converter having an adequate sample rate and resolution, and thus can obtain precise reception timing information.

SUMMARY

The present application is made in consideration of the above-described problems. According to an embodiment, there is provided a wireless communication device that receives a UWB signal employing a pulse in a wideband, and includes an antenna part that receives a UWB signal, a one-bit A/D converter that converts a signal received by the antenna part into a digital signal, and N parallel counters that count the number of samples having a logical value of 1 in parallel for each N samples, and output the counted number on each frame basis. N denotes the number of samples in one frame time period. The wireless communication device also includes a timing detector that detects the reception timing of a frame based on the number of samples having a logical value of 1 counted for each N samples.

Employment of UWB communication systems for, besides high-speed data transmission, acquisition of position information based on ranging has been studied. In order to realize a highly accurate ranging function, it is needed for a UWB receiver to acquire precise information on the reception timing of a UWB signal.

When the reception timing of a UWB signal is detected with use of an analog circuit, complexity of the circuit cannot be avoided due to the configurations of a delay circuit and a frequency synthesis circuit. Therefore, it will be preferable to use a method in which digital processing is executed for a received UWB signal to thereby detect the reception timing. In this case, however, the setting of the sample rate and resolution (the number of bits) of an A/D converter is an issue.

The present inventors consider that, in a UWB communication system used mainly for ranging, even an A/D converter with a low resolution is sufficiently available as long as its sample rate is high.

The wireless communication device according to an embodiment includes a one-bit A/D converter, and utilizes N parallel counters. Thus, the wireless communication device executes digital processing for a received UWB signal to thereby detect the reception timing.

The antenna part includes at least one antenna element, a filter, a Low Noise Amplifier (LNA), and so on. The wireless communication device detects signal intervals and no-signal intervals, which imposes no particular limitation on the antenna, which serves as the communication path. The one-bit A/D converter is fed with the received signal from the antenna part, and compares the intensity of the signal with a certain threshold value, to thereby convert the signal into a binary digital signal. The conversion speed of the A/D converter may be determined based on the employed communication method and symbol length. Typically an output from an A/D converter is a digital signal of a high sample rate. Upon reception of the digital signal, the N parallel counters count the number of samples having a logical value of 1 in parallel for each N samples, and output the counted number for each frame basis. The timing detector then detects the reception timing of a frame based on the counted number of the samples with a logical value of 1.

Although the sample rate of the digital signal after the A/D conversion is high, the signal becomes a digital signal of a low sample rate in the N parallel counters. Therefore, statistical filter processing in the timing detector can be executed as digital signal processing, and is carried out in many cases with use of a Digital Signal Processor (DSP) and a Field Programmable Gate Array (FPGA) similar to those in general digital signal processing.

As described above, in the wireless communication device according to the embodiment, reception timing is detected by utilizing a comparator (one-bit A/D converter) and N parallel counters. Therefore, there is no need to use a high-resolution A/D converter and high-speed N parallel ALUs, which can reduce the costs, size and power consumption of a receiver.

According to an embodiment, there is provided a wireless communication device that receives a UWB signal employing a pulse in a wideband, and includes an antenna part that receives a UWB signal, an A/D converter that converts a signal received by the antenna part into a digital signal by executing oversampling, and a timing detector that detects reception timing based on the digital signal output from the A/D converter.

The wireless communication device according to the embodiemnt includes a high-speed oversampling A/D converter, and executes digital processing for a received UWB signal to thereby detect the reception timing. The oversampling A/D converter may include a one-bit A/D converter that converts a signal into a digital signal, and N parallel counters that count the number of samples having a logical value of 1 in parallel for each N samples and output the counted number on each frame basis.

The antenna part includes at least one antenna element, a filter, an LNA, and so on. The wireless communication device detects signal intervals and no-signal intervals, which imposes no particular limitation on the antenna, which serves as the communication path. The A/D converter oversamples a signal received by the antenna part at a high sample rate and converts the signal into a digital signal. The conversion speed of the A/D converter is determined based on the employed communication method. The timing detector detects the reception timing based on an output from the A/D converter.

Since the output from the A/D converter is typically a digital signal of a high sample rate, simple use of an existing digital CDMA receiver system cannot detect the reception timing. Therefore, in the second embodiment, the timing detector may include two-stage matched filters of a chip matched filter and a frame matched filter, in order to allow processing of detecting reception timing with use of DSP and FPGA similar to those in general digital signal processing.

The former-stage chip matched filter may calculate the correlation value between an input digital received signal and a certain template signal. If the correlation value is larger than a threshold value, the chip matched filter may recognize that a correct transmission pulse signal has arrived, and may output to the latter-stage frame matched filter an indication as to the presence of a pulse and the number of chips by which the reception timing is offset. The latter-stage frame matched filter may calculate the correlation value between a spreading code and a received frame signal, to thereby determine whether the received frame is correct or incorrect. If a determination is made that the received frame is correct, the frame matched filter may finally output the reception timing. In contrast, if a determination is made that the received frame is incorrect, the frame matched filter may determine that the detection of a pulse fails to be carried out successfully, and therefore may send a feedback to the chip matched filter so that the threshold value is changed. The implementation of the timing detection circuit is easy since simply two matched filters are included therein. In addition, checking at two stages will enhance the accuracy of timing detection.

That is, in the wireless communication device according to the second embodiment, reception timing is detected by utilizing a high-speed A/D converter, a chip matched filter and a frame matched filter. Therefore, there is no need to employ an analog circuit for achieving the function of detecting reception timing, and the function can be realized by simple digital processing.

The embodiments of the present application can provide an excellent wireless communication device that executes digital processing for a received UWB signal and thus can detect the reception timing.

In addition, the embodiments of the present application can provide an excellent wireless communication device that executes digital processing for a received UWB signal with use of an A/D converter having an adequate sample rate and resolution, and thus can obtain precise reception timing information.

In the wireless communication devices according to the embodiments of the present application, reception timing is detected by utilizing a comparator (one-bit A/D converter) and N parallel counters. Therefore, there is no need to use a high-resolution A/D converter and high-speed N parallel ALUs, which can reduce the costs, size and power consumption of a receiver.

Furthermore, in the wireless communication device according to an embodiment, reception timing is detected by utilizing a high-speed A/D converter, a chip matched filter and a frame matched filter. Therefore, there is no need to use an analog circuit for achieving the function of detecting reception timing, and the function can be realized by simple digital processing. Thus, the costs, size and power consumption of a receiver can be reduced.

Still other objects, features and advantages of the present application will become apparent from the following more detailed description based on embodiments of the present invention and the accompanying drawings.

Additional features and advantages are described herein, and will be apparent from, the following Detailed Description and the figures.

DETAILED DESCRIPTION

Embodiments of the present invention will be described in detailed below with reference to the accompanying drawings.

The embodiments relate to a wireless communication device that receives a UWB signal employing pulses in a wideband, and particularly to a wireless communication device that utilizes UWB communication with a transmitter based on a weak impulse train to thereby measure the distance between objects.

When the reception timing of a UWB signal is detected with use of an analog circuit, complexity of the circuit cannot be avoided due to the configurations of a delay circuit and a frequency synthesis circuit. Therefore, it will be preferable to use a method in which digital processing is executed for a received UWB signal to thereby detect the reception timing. In this case, however, the setting of the sample rate and resolution (the number of bits) of an A/D converter is an issue. Regarding this respect, the present inventors consider that, in a UWB communication system used mainly for ranging, even an A/D converter with a low resolution is sufficiently available as long as its sample rate is high.

Figure 1:
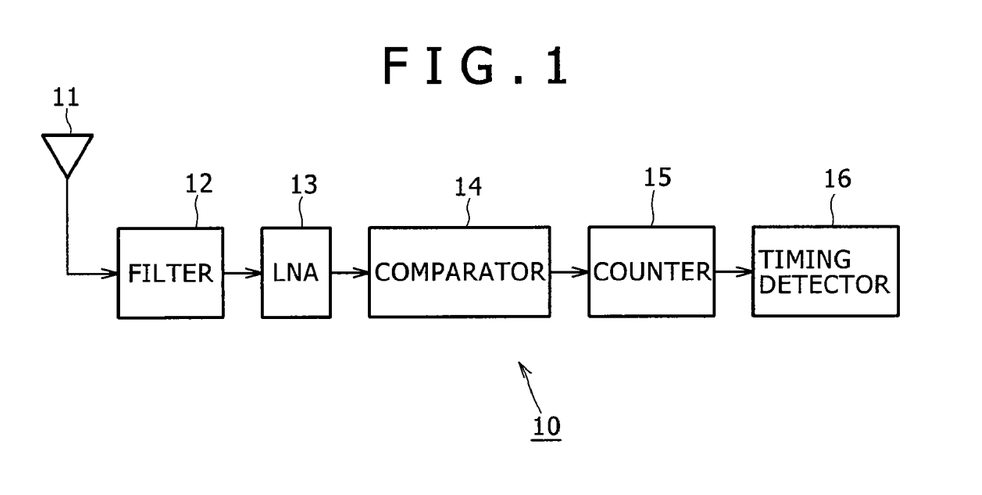
FIG. 1 is a diagram schematically illustrating the hardware configuration of a wireless communication device according to one embodiment.

FIG. 1 schematically illustrates the configuration of a wireless communication device 10 according to one embodiment. The wireless communication device 10 operates as a UWB receiver, and includes a one-bit A/D converter. Furthermore, the wireless communication device 10 utilizes N parallel counters to execute digital processing for a received UWB signal and thus detect the reception timing.

As shown in FIG. 1, the wireless communication device 10 includes an antenna element 11, a filter 12, a Low Noise Amplifier (LNA) 13, a comparator 14, a counter 15 and a timing detector 16.

At least one antenna element 11, the filter 12 and the LNA 13 construct an antenna part. The wireless communication device detects signal intervals and no-signal intervals, which imposes no particular limitation on the antenna, which serves as the communication path.

The comparator 14 operates as a one-bit A/D converter. The comparator 14 is fed with the received signal from the antenna part and compares the intensity of the signal with a certain threshold value, to thereby convert the signal into a binary digital signal. That is, the values of the sample data are limited to 0 and 1 ($\{0, 1\}$). Although the conversion speed of the A/D converter is determined based on the employed communication method, the output therefrom is typically a digital signal of a high sample rate.

Figure 2:
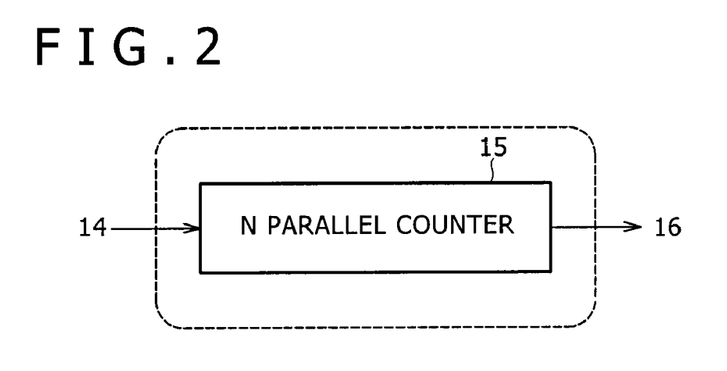
FIG. 2 is a diagram illustrating the configuration of parallel counters 15 in a wireless communication device 10 shown in FIG. 1.

The counter 15 is composed of N parallel counters as shown in FIG. 2. When the digital signal is input to the counter 15 from the comparator 14, the counter 15 counts the number of samples with a logical value of "1" for each N samples, and outputs the counted number on each frame basis. The timing detector 16 then detects the reception timing of the frame based on the counted number.

Since the values of the samples input from the comparator 14 are limited to 0 and 1 ($\{0, 1\}$), provision of ALUs and a register is not needed, but it is sufficient for the device 10 to include the parallel counters 15 that count the number of input samples with a logical value of "1". Although the sample rate of the digital signal after the A/D conversion is high, the signal becomes a digital signal of a low sample rate in the N parallel counters 15. In addition, there is no need to exchange data with a register and to provide a complement generation circuit, which is required for addition of negative numbers. Therefore, it is easy to implement the counter circuit. Thus, improvements in both processing speed and power consumption are expected.

Operation of detecting reception timing in the wireless communication device 10 in FIG. 1 will be described below with reference to FIGS. 3 to 7.

Figure 3:
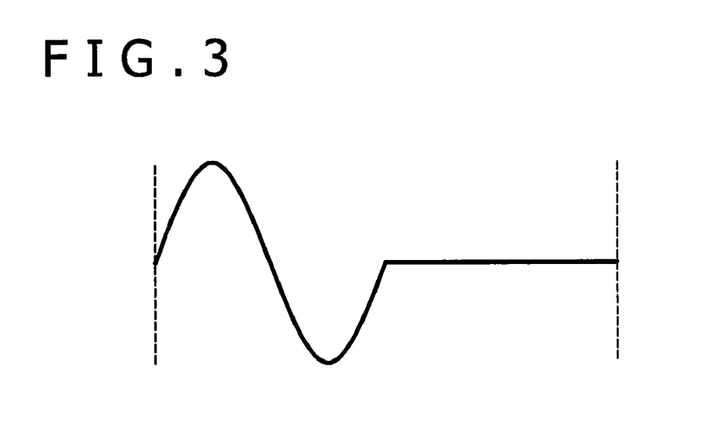
FIG. 3 is a diagram illustrating an example of a received frame.

FIG. 3 illustrates an example of a received signal in UWB communication. The signal employs a pulse wave in a wideband like one shown in the drawing.

Figure 4:
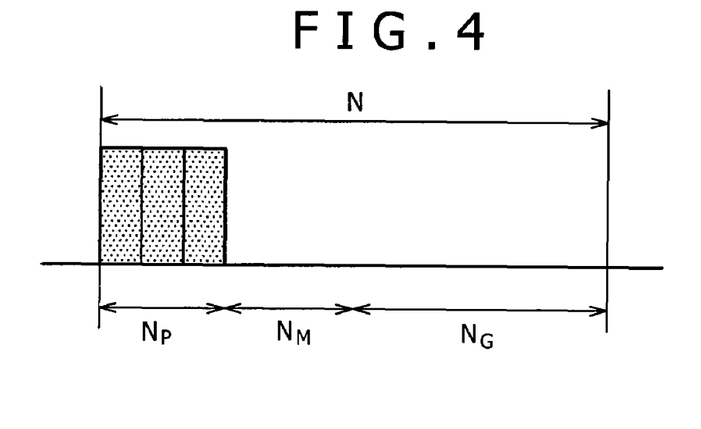
FIG. 4 is a diagram illustrating an example of a valid frame when thermal noises are absent therein.

The received signal output from the antenna part is input to the comparator 14. If no thermal noise exists in the signal, the received frame is A/D converted into binary sample data as shown in FIG. 4.

The following description is based on an assumption that one frame is sampled at N sampling points by the comparator 14. NP samples resulting from sampling of positive signal components in FIG. 3 correspond to the region with a logical value of 1 in FIG. 4. In addition, NM samples and NG samples that result from sampling of negative signal components and a guard interval, respectively, in FIG. 3 correspond to the region with a logical value of 0 in FIG. 4.

Figure 5:
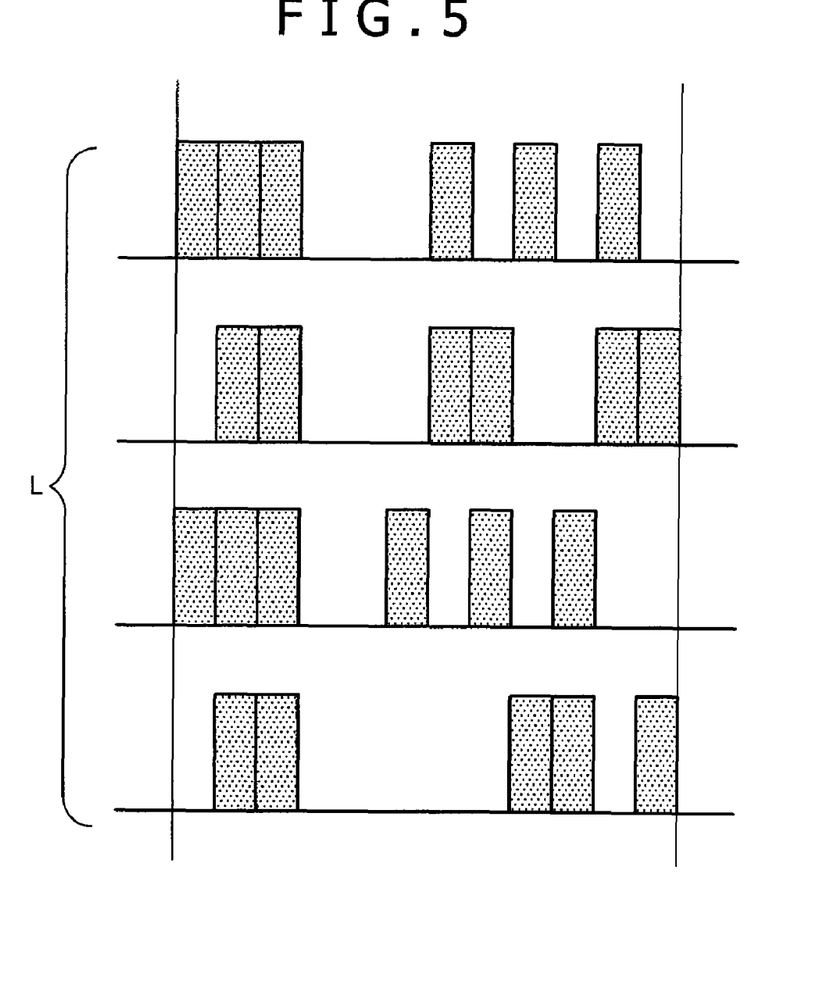
FIG. 5 is a diagram illustrating an example of a valid frame group when thermal noises are present therein.

FIG. 5 shows an example of samples resulting from A/D conversion of a received signal that includes thermal noises. Since thermal noises are in accordance with the Gaussian distribution, the regions of the NP samples and NM samples, which correspond to signal components, are unsusceptible to the effect of thermal noises, while the regions of the NG samples, which do not correspond to signal components, are affected by noises. The example of FIG. 5 is based on an assumption that, of the NG samples, the NG/2 samples have a logical value of 1.

Figure 6:
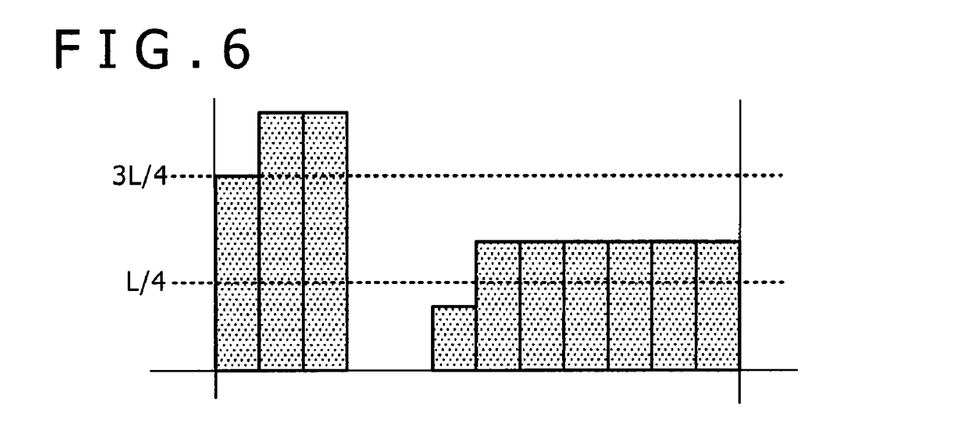
FIG. 6 is a diagram illustrating an example of an output from N parallel counters.

The outputs from the comparator 14 are input to the N parallel counters 15, where the number of samples having a logical value of 1 is counted for each N samples. FIG. 6 shows the outputs from the counter 15 when counting for L (L=4) frames is carried out as shown in FIG. 5 for example. The maximum value of the outputs from the counter is L.

Figure 7:
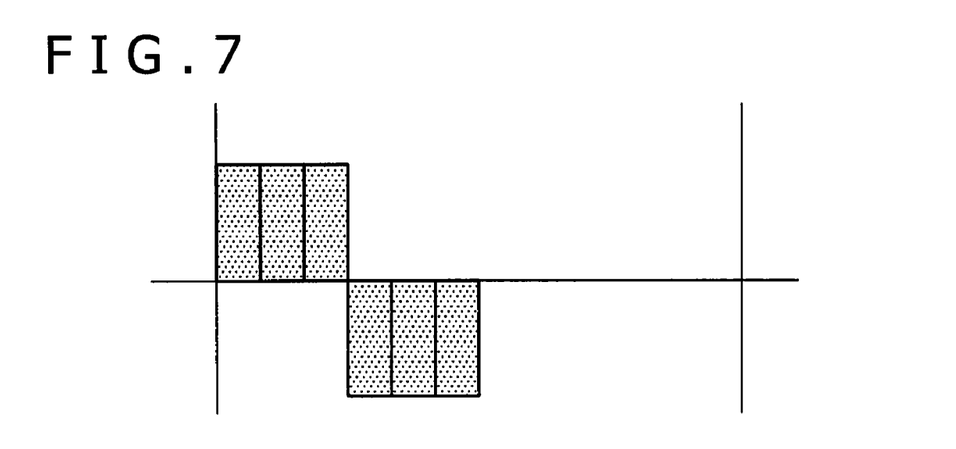
FIG. 7 is a diagram illustrating an example of a valid frame recognized by a timing detector 16.

The outputs from the N parallel counters 15 are input to the timing detector 16. In the region of the NG samples, which are directly affected by thermal noises, each output from the N parallel counters 15 is expected to have a value of L/2. In the region of the NP samples and NM samples corresponding to signal components, each output is expected to have a value of L or 0. Consequently, by setting two threshold values of 3L/4 and L/4 as shown in FIG. 6, a determination is made as follows: the frame signal value is 1 when the counted value is 3L/4 or L; the frame signal value is −1 when it is L/4 or 0; and the frame signal value is 0 when it is L/2. Thus, as shown in FIG. 7, a valid frame can be recognized, which allows detection of the reception timing.

Figure 8:
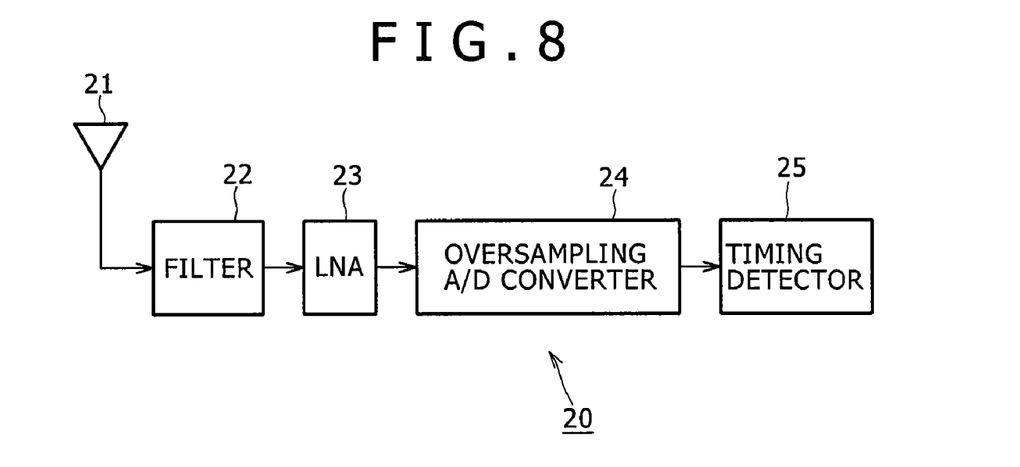
FIG. 8 is a diagram schematically illustrating the hardware configuration of a wireless communication device 20 according to another embodiment.

FIG. 8 schematically illustrates the configuration of a wireless communication device 20 according to another embodiment of the present invention. The wireless communication device 20 operates as a UWB receiver, and includes a high-speed oversampling A/D converter. The wireless communication device 20 executes digital processing for a received UWB signal to thereby detect the reception timing.

As shown in FIG. 8, the wireless communication device 20 includes an antenna element 21, a filter 22, an LNA 23, an A/D converter 24, and a timing detector 25.

At least one antenna element 21, the filter 22 and the LNA 23 construct an antenna part. The wireless communication device detects signal intervals and no-signal intervals, which imposes no particular limitation on the antenna, which serves as the communication path.

The A/D converter 24 implements oversampling at a high sample rate. For example, the A/D converter 24 can be composed of a one-bit A/D converter that converts a signal into a digital signal, and N parallel counters (see FIG. 2) that count the number of samples having a logical value of 1 in parallel for each N samples and output the counted number on each frame basis.

Figure 9:
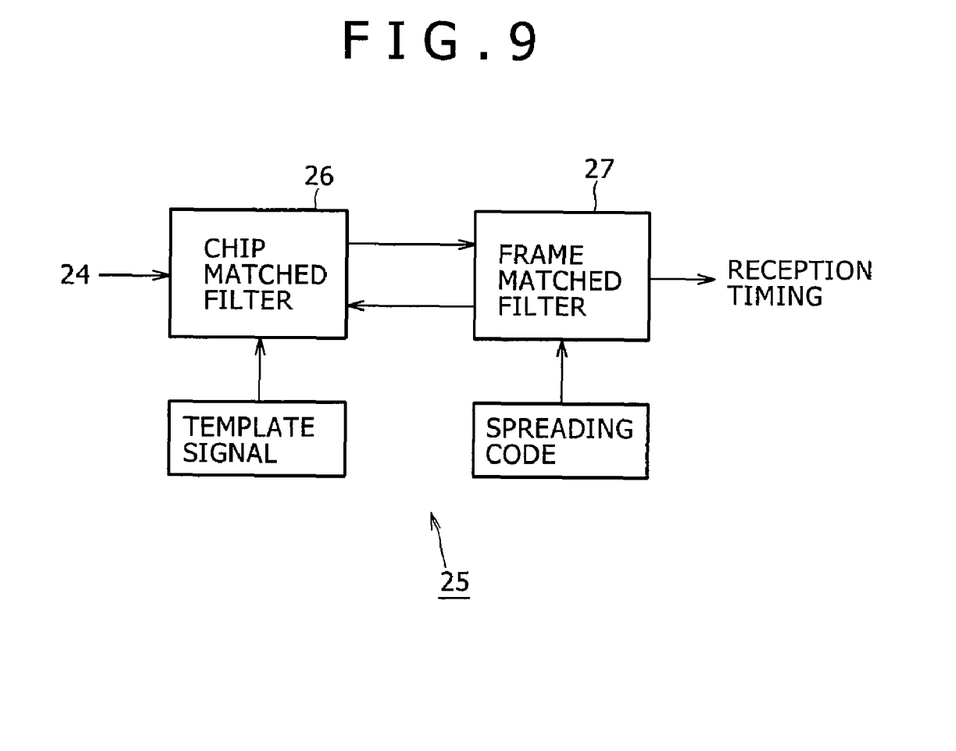
FIG. 9 is a diagram illustrating the internal configuration of a timing detector 25 in the wireless communication device 20 shown in FIG. 8.

The output from the A/D control 24 is input to the timing detector 25, where the reception timing is detected. However, since this A/D converted output is a digital signal of a high sample rate, simple use of an existing digital CDMA receiver system cannot detect the reception timing. In order to address this problem, in the wireless communication device 20 according to the present embodiment, the timing detector 25 includes two-stage matched filters of a chip matched filter 26 and a frame matched filter 27 as shown in FIG. 9. This configuration allows processing of detecting reception timing with use of DSP and FPGA similar to those in general digital signal processing.

The former-stage chip matched filter 26 calculates the correlation between an input digital received signal and a certain template signal. When the correlation value is above a threshold value, the chip matched filter 26 recognizes that a correct transmission pulse signal has arrived, and outputs to the latter-stage frame matched filter 27 an indication as to the presence of a pulse and the number of chips by which the reception timing is offset.

The latter-stage frame matched filter 27 calculates the correlation value between a spreading code and a received frame signal to thereby determine whether the received frame is correct or incorrect. If a determination is made that the received frame is correct, the reception timing is output finally. In contrast, if a determination is made that the received frame is incorrect, the frame matched filter 27 determines that the detection of a pulse fails to be carried out successfully, and therefore sends a feedback to the chip matched filter 26 so that the threshold value is changed.

The implementation of the timing detection circuit is easy since simply two matched filters 26 and 27 are thus included therein. In addition, checking at two stages will enhance the accuracy of timing detection.

Operation of detecting reception timing in the wireless communication device 20 in FIG. 8 will be described below with reference to FIGS. 10 to 13.

Figure 10:
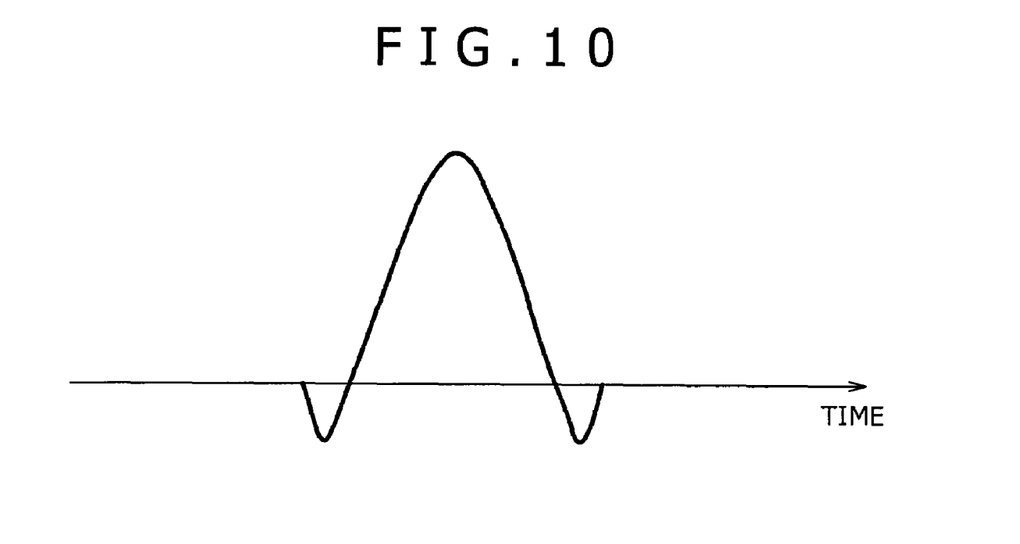
FIG. 10 is a diagram illustrating a received pulse waveform.
Figure 11:
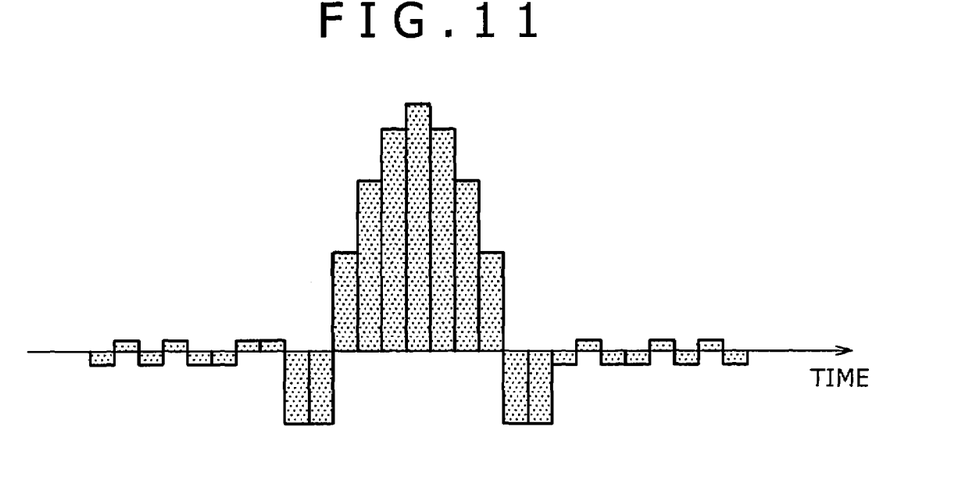
FIG. 11 is a diagram illustrating the waveform of a digital received pulse signal.

A transmitter operates in accordance with spreading codes: the transmitter sends a pulse if the spreading code is 1, and does not send a pulse if it is any other value. FIG. 10 illustrates the waveform of a pulse signal received by the wireless communication device 20 as a receiver when no thermal noise is included in the output from the antenna part. FIG. 11 shows an example of samples resulting from A/D conversion of a received pulse signal including thermal noises.

Figure 12:
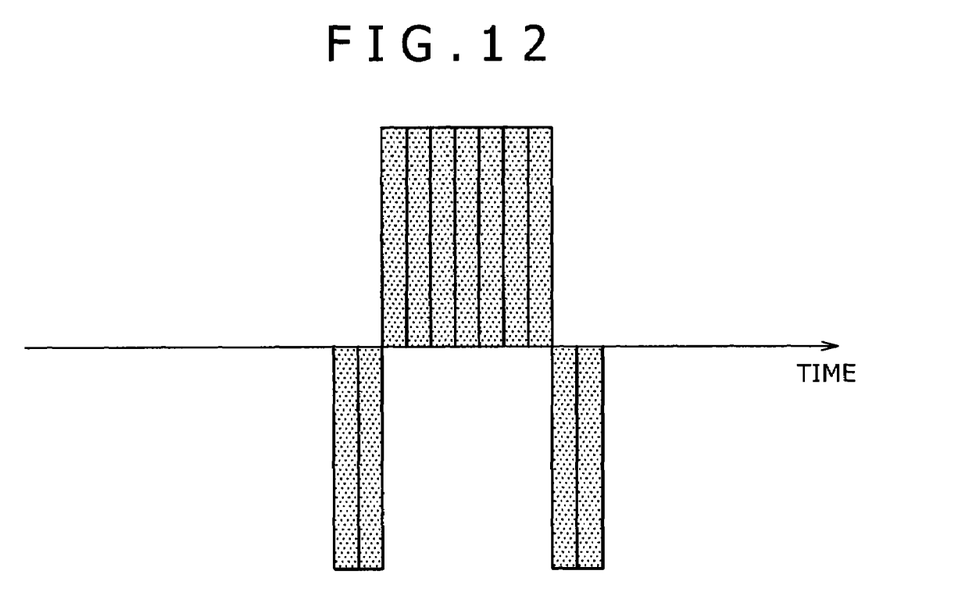
FIG. 12 is a diagram illustrating a template waveform.

According to the template signal used by the chip matched filter 26, a positive signal component, a negative signal component, and a null signal component of an ideal received pulse signal are defined as values of 1, −1 and 0, respectively, as shown in FIG. 12. The chip matched filter 26 calculates the correlation between the waveform of the digital received pulse shown in FIG. 11 and the waveform of the template signal shown in FIG. 12, and determines the presence of a pulse depending on whether or not the correlation value is beyond a certain threshold value $\alpha$.

Figure 13:
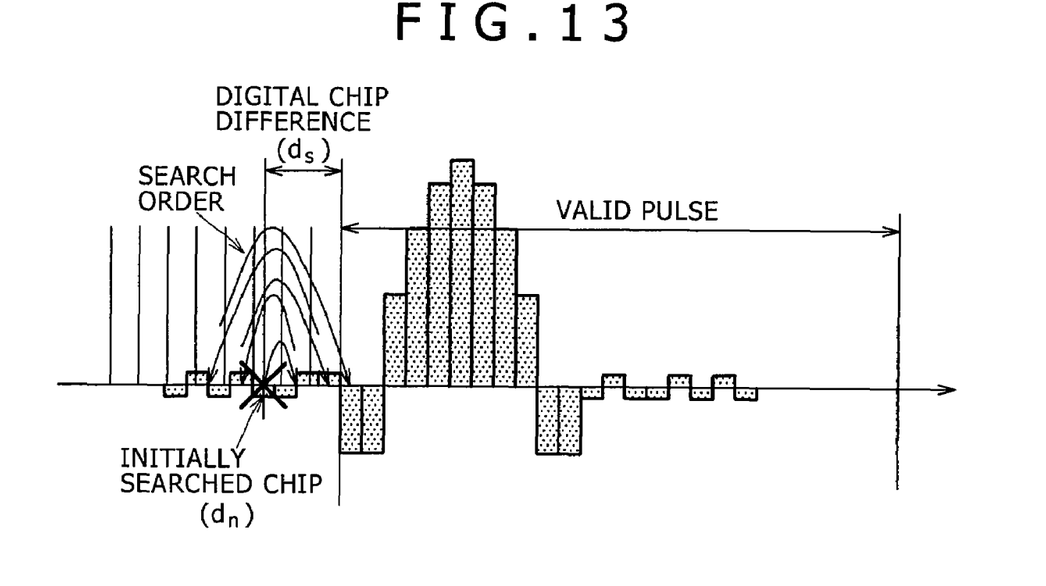
FIG. 13 is a diagram showing operation of detecting a pulse.

FIG. 13 graphically shows operation of checking the received chip position of a pulse. Searching of chips is carried out in such a manner that the searching is initialized for a pulse position dn inferred from the previous received frame, and is sequentially carried out for the anterior and posterior chips alternately until a valid pulse is found. When a valid pulse is found, the chip matched filter 26 outputs an indication that the received frame signal is 1, and a received timing offset ds.

Subsequently, the frame matched filter 27 calculates the correlation value between the received frame signal and spreading code, to thereby determine whether or not the detected received-frame information is correct. If the length of the calculated correlation value is equal to the length of the spreading code, a determination is made that the received-frame information is correct. Therefore, the received timing offset ds is output. In contrast, if the correlation value length is not equivalent to the spreading code length, a determination is made that the detection of the received-frame information is erroneous. Therefore, the frame matched filter 27 sends a feedback to the chip matched filter 26 so that the threshold value α is changed. Thus, a valid frame is recognized, which is then followed by detection of the received frame.

The present invention has been described in detail above with reference to specific embodiments of the present invention. However, it should be apparent that various modifications and substitutions might be incorporated in the embodiments by those skilled in the art without departing from the scope and spirit of the present invention. That is, the embodiments of the present invention have been disclosed merely for purposes of illustration. Therefore, the description in the present specification should not be interpreted to limit the scope of the present invention.

The invention is claimed as follows:

1. A wireless communication device that receives an Ultra Wide Band signal employing a pulse in a wideband, comprising:
    an antenna part that receives an Ultra Wide Band signal;
    a one-bit analog-to-digital converter that converts signal received by the antenna part into a digital signal;
    N parallel counters that count the number of samples having a logical value of 1 in parallel for each of N samples, and output the counted number on a frame-by-frame basis, N denoting the number of samples in one frame time period; and
    a timing detector that detects reception timing of a frame based on the number of samples having a logical value of 1 counted for each N samples.

2. The wireless communication device according to claim 1, wherein a conversion speed of the analog-to-digital converter is determined based on an employed communication method.

3. A wireless communication device that receives an Ultra Wide Band signal employing a pulse in a wideband, comprising:
    an antenna part that receives a Ultra Wide Band signal;
    an oversampling analog-to-digital converter that converts a signal received by the antenna part into a digital signal by executing oversampling;
    a timing detector that detects reception timing based on the digital signal output from the analog-to-digital converter, and
    wherein the oversampling analog-to-digital converter includes a one-bit analog-to-digital converter that converts a signal into a digital signal, and N parallel counters that count the number of samples having a logical value of 1 in parallel for each of N samples and output the counted number on a frame-by-frame basis.

4. A wireless communication device that receives an Ultra Wide Band signal employing a pulse in a wideband, comprising:
    an antenna part that receives a Ultra Wide Band signal;
    an oversampling analog-to-digital converter that converts a signal received by the antenna part into a digital signal by executing oversampling; and
    a timing detector that detects reception timing based on the digital signal output from the analog-to-digital converter, and
    wherein the timing detector includes two-stage matched filters including a chip matched filter and a frame matched filter wherein the chip matched filter calculates a correlation value between an input digital received signal and a certain template signal, and if the correlation value is larger than a threshold value, the chip matched filter recognizes that a correct transmission pulse signal has arrived, and outputs to the frame matched filter an indication as to presence of a pulse and a result of detection of reception timing.

5. The wireless communication device according to claim 4, wherein the frame matched filter calculates a correlation value between a received frame signal and a spreading code to thereby determine whether a received frame is correct or incorrect, and the frame matched filter finally outputs reception timing if a determination is made that the received frame is correct, and the frame matched filter instructs the chip matched filter to change the threshold value if a determination is made that the received frame is incorrect.

* * * * *